United States Patent [19]

Faucher

[11] Patent Number: 4,840,777

[45] Date of Patent: Jun. 20, 1989

[54] PROCESS FOR INHIBITING MONO AND DIETHANOLAMINE DEGRADATION

[75] Inventor: Joseph A. Faucher, Carlsbad, Calif.

[73] Assignee: UOP, Des Plaines, Ill.

[21] Appl. No.: 252,989

[22] Filed: Oct. 4, 1988

Related U.S. Application Data

[63] Continuation-in-part of Ser. No. 144,654, Jan. 12, 1988, abandoned, which is a continuation-in-part of Ser. No. 921,458, Oct. 22, 1986, abandoned.

[51] Int. Cl.$^4$ ............................................. B01D 53/34
[52] U.S. Cl. ..................................... 423/229; 423/242
[58] Field of Search ............... 423/226, 229, 228, 229, 423/242

[56] References Cited

U.S. PATENT DOCUMENTS 3,535,260 10/1970 Singh .................................. 423/229
4,461,749 7/1984 Thorn .................................. 423/228

Primary Examiner—John Doll
Assistant Examiner—Lori S. Freeman
Attorney, Agent, or Firm—Thomas K. McBride; John G. Tolomei; Warren K. Volles

[57] ABSTRACT

A process for the purification of a gas stream containing impurities comprising (i) passing the gas stream through an aqueous solution of stabilized monoethanolamine or diethanolamine in such a manner that the impurities are absorbed into the monoethanolamine solution or diethanolamine solution to form a rich solution and (ii) regenerating the monoethanolamine or diethanolamine solvent from the rich solution so as to remove the impurities, (iii) recycling the solvent into the aqueous solution in a closed loop and introducing a stabilizer into the recirculating solvent solution in an amount of about 4 to about 25 percent by weight based on the total weight of solution, the stabilizer being methyldiethanolamine.

2 Claims, No Drawings

PROCESS FOR INHIBITING MONO AND DIETHANOLAMINE DEGRADATION

This case is a continuation-in-part of Ser. No. 144,654, filed Jan. 12, 1988 now abandoned which in turn is a continuation-in-part of Ser. No. 921,458, filed Oct. 22, 1986, now abandoned.

TECHNICAL FIELD

This invention relates to a process for inhibiting the degradation of mono- and diethanolamine solutions useful in the purification of gas streams.

BACKGROUND ART

One method for purifyinq gas streams, such as natural gas, is by washing with a solvent that absorbs the impure components (primarily acid gases such as carbon dioxide and hydrogen sulfide). The solvent is continuously circulated through a wash column or absorber where the solvent is loaded with acid gases. After the rich solvent is reduced in pressure, heated, and steam stripped in a regenerator column to remove the acid gases, the lean solvent is cooled and returned to the absorber.

The mechanism of absorption involves the release of heat due to the exothermic heats of absorption and reaction. Heat is consumed in the regenerator as the absorption process is reversed through desorption or stripping.

The use of aqueous mono- and diethanolamine solutions as solvents in these absorption/regenerator systems is well known as is the problem of mono and diethanolamine degradation. Degradation of mono- and diethanolamines is believed to be caused (i) by the presence of certain impurities such as hydrogen sulfide, carbonyl sulfide, and mercaptans in the gas stream to be purified and (ii) by air in those processes where air is allowed to contact the gas stream. Unfortunately, degraded mono- or diethanolamines have to be replaced frequently with the attendant cost of fresh monoor diethanolamine solutions and the time lost by the shutdown of the absorption/regeneration process.

To combat degradation, trialkanolamines, such as triethanolamine, triisopropanolamine, and triisobutanolamine, are introduced into the mono- or diethanolamine solutions. See U.S. Pat. No. 3,535,260, which is incorporated by reference herein. The trialkanolamines, however, suffer from the disadvantage of being much higher boiling and having a higher molecular weight than mono- or diethanolamine thus they cannot be recovered during the regeneration step.

SUMMARY OF THE INVENTION

The method of the present invention involves the purification of a gas stream containing one or more of the following impurities: $H_2S$, $COS$, $CO_2$ and mercaptans comprising; (i) passing the gas stream through an aqueous solution of stabilized monoethanolamine or diethanolamine in such a manner that the impurities are absorbed into the monoethanolamine or diethanolamine solution to form a rich solution, (ii) regenerating the monoethanolamine or diethanolamine solvent from the rich solution so as to remove the impurities, (iii) recycling the monoethanolamine or diethanolamine solution by feeding it back into contact with the gas stream in a closed loop and (iv) introducing methyldiethanolamine into the recirculating aqueous solvent solution in an amount of from 4 to 25 percent by weight based on the total weight of the solution so as to inhibit degradation of the monoethanolamine or diethanolamine in solution.

DETAILED DESCRIPTION

As noted above, the process for using an aqueous solution of monoethanolamine or diethanolamine as an absorbent for impurities in gas streams is conventional. Insofar as monoethanolamine is concerned, the aqueous solution is generally made up of about 15 to about 35 percent by weight of monoethanolamine and about 65 to about 85 percent by weight of water, both percentages based on the total weight of the solution. Higher concentrations of monoethanolamine, i.e., up to about 40 or about 45 percent by weight, prove advantageous when lower solvent temperatures are used possibly with corrosion inhibiting additives. Examples of corrosion inhibiting additives may be found in U.S. Pat. No. 3,808,140, incorporated by reference herein. Aqueous solutions of diethanolamine generally contain about 30 to about 55 percent by weight of diethanolamine and about 45 to about 70 percent by weight of water, both percentages based on the total weight of the solution. Higher concentrations of diethanolamine, i.e., up to about 60 or about 65 percent by weight, also, prove more advantageous when corrosion inhibiting additives and lower solvent temperatures are used.

A stabilizer, i.e., a chemical compound which stabilizes the monoethanolamine or diethanolamine against, or inhibits, degradation, is added in an amount of about 4 to about 25 percent by weight of the total solution and preferably between about 10 to about 20 percent by weight, based on the weight of the monoethanolamine or diethanolamine in the solution. It will be understood by those skilled in the art that amounts of stabilizer up to 35 percent by weight and even greater amounts can be added with an increase in stabilizer effect; however, additions of stabilizer of greater than about 25 percent are impractical as they tend to radically change the operating conditions of the plant. A typical monoethanolamine solution comprises about 70 percent by weight water and about 30 percent by weight monoethanolamine, based on the weight of the solution, and about 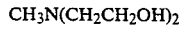 percent by weight stabilizer based on the total weiqht of the solution.

The formula for the stabilizer of interest here is as follows:

methyldiethanolamine (MDEA)

$CH_3N(CH_2CH_2OH)_2$

The advantageous characteristics of the stabilizer mentioned above is that it is relatively inexpensive, highly soluble in water, and higher boiling than water so that it is, for example, not lost in the stripping step of a cyclic carbon dioxide removal process.

Evidence indicates that this stabilizer functions by the mechanism of peroxide decomposition, i.e., it decomposes organic peroxides and hydroperoxides. This has the effect of interrupting the free radical chain process by which autoxidation of mono and diethanolamine occurs.

Schematically, this can be represented as follows:

Activation $$RH \rightarrow R \cdot + H \cdot \qquad (1)$$

Propagtion $$R\cdot + O_2 \rightarrow RO_2\cdot \quad (2)$$
$$RO_2\cdot + RH \rightarrow ROOH + R\cdot \quad (3)$$

Decomposition of peroxide $$ROOH \rightarrow RO\cdot + \cdot OH \quad (4)$$
$$2ROOH \rightarrow RO\cdot + RO_2\cdot H_2O \quad (5)$$

For saturated hydrocarbons, thermal initiation occurs by a reaction such as:

$$RH + O_2 \rightarrow R\cdot + HO_2\cdot \quad (6)$$

Reaction (6), however requires considerably more energy than does reaction (4). Consequently, reaction (4) tends to become the main reaction of initiation even when hydroperoxide concentration is very low.

A peroxide decomposer functions by inducing the destruction of peroxides by either of the following two reactions:

$$Y + ROOH \rightarrow ROH + YO \quad (7)$$

$$Z + ROOH \rightarrow Z + \text{inactive products} \quad (8)$$

Reactions (7) and (8) are not stoichiometric. The tertiary amine functions more as a catalyst for decomposition as in reaction (8) rather than as a straightforward reducing agent as in reaction (7).

The absorption step is carried out at a temperature in the range of about 40° C. to about 90° C. and at a pressure of about 200 psig to about 800 psig. The regeneration step is carried out at a temperature in the range of about 100° C. to about 115° C. and at a pressure of about 5 psig to about 15 psig.

Equipment used in the absorption/regeneration process is also conventional and typically comprises the following: absorber, regenerator, lean/rich solution heat exchangers, lean solvent cooler, reboilers, overhead condenser, lean solvent pump, reflux water pump, hydraulic turbine, and relux condenser.

The following examples illustrate the stabilizing effect of the selected stabilizer. It is found that the stabilizer can be recovered during the regeneration step. Percentages are by weight.

EXAMPLE 1

A. Laboratory air is sparged through a fritted glass tube into a stirred vessel (closed and fitted with a condenser) in which there are 300 milliliters of a solution containing 25 percent monoethanolamine, and 75 percent water (carbonated to saturation with carbon dioxide). The temperature of the solution is maintained at 75° C. The sparging is continued for 8 days.

B. Extent of oxidation is judged semi-quantitatively by determination of the formation of "heat stable salts" (this expression is defined as the reaction of a strong acid with an alkanolamine solvent that does not permit the thermal regeneration of the alkanolamine under regeneration conditions. The strong acid remains bound to the basic alkanolamine and this resulting "salt" product is "heat stable" under regeneration conditions, e.X., the oxidative degradation of alkanolamines forms lower molecular weight carboxylic acids. These acids, in turn, react with unreacted alkanolamine molecules to form heat stable salts.) This is accomplished by titration in methanol to a pH of 11.3 against 0.5N potassium hydroxide. The formation of heat stable salts is a measure of the bound monoethanolamine in solution, unavailable for carbon dioxide absorption. Under these conditions of aeration, an additional amount of monoethanolamine is lost to miscellaneous degradation products, roughly equal to the quantity determined as heat stable salts.

C. A qualitative judgment of oxidative degradation can also be made by the color apparent on visual inspection. A control solution (with no stabilizer) turns first to yellow, passes to orange, and finally turns to dark red after 4 days of sparging at 75° C. When a successful stabilizer is used at a sufficient concentration level the monoethanolamine solution remains water-white in color, even after 4 days.

D. Organic peroxides in solution are determined by the very sensitive colorimetric test for ferric thiocyanate.

EXAMPLE 2

Example 1A is repeated. At the end of the 8 days, the solution is removed, any water lost is replaced, and a 100 milliliter aliquot is regenerated to drive out residual carbon dioxide. Two determinations are made on the regenerated solution: the first is a titration with standardized hydrochloric acid to find the total alkalinity remaining; the second repeats Example 1B.

There appears to be a linear loss of alkalinity, i.e., destruction of monoethanolamine, amounting to one percent per day. The formation of heat stable salts rises rapidly in the first two days and then rises slowly.

It is concluded from the data that the determination of loss of alkalinity is a more meaningful measure of monoethanolamine oxidation than is the formation of heat stable salts.

EXAMPLE 3

Example 2 is repeated using three and two different solutions, respectively, in runs of 3, 6, and 12 days each. The first solution (1) is a control, i.e., without a stabilizer. The second solution (2) has added to it, 20 percent (based on the weight of the monoethanolamine) of MDEA.

|   | 3 days | 6 days | 12 days |
|---|---|---|---|
| Percent Loss of Alkalinity (approx.) | | | |
| (1) Control | 3 | 6 | 12 |
| (2) MDEA | 1 | 1.2 | 1.5 |
| Percent Formation of heat stable salts (approx.) (based on weight of monoethanolamine) | | | |
| (1) Control | 1.5 | 1.6 | 1.8 |
| (2) MDEA | 0.5 | 0.6 | 0.8 |

EXAMPLE 4

A typical absorption/regeneration process is carried out. Feed gas enters the bottom of a packed or trayed absorber column at a temperature of 120° F. to 170° F. As the gas flows up through the column, it contacts an amine solution, which enters, at the top of the absorber, relatively free of carbon dioxide and at at temperature of about 110° F. Carbon dioxide is absorbed from the gas into the amine solution, almost all of the carbon dioxide being removed from the gas stream. The temperature of the solution increases due to the heat of absorption of carbon dioxide, the rich solution, which is loaded with carbon dioxide, discharging from the bottom of the absorber at an elevated temperature.

The rich solution, at the pressure of the feed gas, flows through a bank of lean/rich heat exchangers where its temperature is increased by exchange with hot lean solvent from the base of the stripper. Power often is recovered from the high pressure, rich solvent stream in a hydraulic turbine, which also serves to reduce the pressure of the rich solution before it enters the top of the regenerator.

In the stripper, a portion of the carbon dioxide flashes from the solution due to the reduction in pressure. The remainder of the carbon dioxide is stripped from the solution with heat supplied by steam and/or process gas in the monoethanolamine solution reboiler(s). Carbon dioxide and steam flow out of the regenerator overhead. To maintain water balance, a portion of the steam is condensed and returned to the regenerator as reflux. Hot regenerated lean solution from the base of the stripper is heat exchanged with rich solution, further cooled with air or cooling water in the lean solution cooler, and pumped back to the top of the absorber. A slipstream of cool lean solution is passed through an activated carbon filter.

A 20 million standard cubic feet per day hydrogen/carbon dioxide steam reformed synthesis gas plant is used to carry out this example. A 28 percent by weight solution of monoethanolamine is employed to remove carbon dioxide from a 200 psig gas stream containing 12 percent by volume of carbon dioxide down to a level of 50 ppm (parts per million) carbon dioxide. Over a 5-year period, the heat stable salt content ranges between 1.1 and 1.9 percent by weight and the iron content ranges between 50 and 100 ppm. During this period, several partial solution purges are required to maintain these values.

Following a normal plant turnaround, the unit is commissioned with fresh monoethanolamine and a stabilizer, methyldiethanolamine, is added. Over a 6-month period, the methyldiethanolamine concentration ranges between 4 and 5 percent by weight. During this same period, the heat stable salt content is less than 0.5 percent by weight and the iron content never exceed 4 ppm. In addition, the plant reports that no solution purging is required, solvent makeup is reduced, corrosion inhibitor control is improved, and corrosion inhibitor makeup is reduced.

EXAMPLE 5

A solution of 30% by weight monoethanolamine (MEA) in water is saturated with carbon dioxide. It is then heated to 68° C. and purged with a mixture of one-third air, two-thirds carbon dioxide for 101 days. Samples of the solution before and after this treatment are analyzed by gas chromatography using a flame ionization detector, which detects only organic matter. The areas of the peaks of the chromatogram are added, and the fraction of the total area due to the MEA peak is calculated. This fraction decreases from 99.9% before treatment to 98.2% after treatment; the difference, 1.7%, beign the areas of the peaks due to organic degradation products of the amine. The average degradation rate is thus calculated as 1.7%/101 days, or 0.017%/day.

EXAMPLE 6

A solution of 25% by weight monoethanolamine (MEA) and 5% by weight methyldiethanolamine (MDEA) in water is similarly saturated with carbon dioxide, heated to 68° C., purged with air and carbon dioxide for 62 days, and analyzed by gas chromatography. The area fraction of the original components, MEA and MDEA, in the chromatograms is unchanged at 99.9%. The least detectable change in this quantity is about 0.1%, so the degradation rate is less than 0.1%/62 days, or 0.002%/day, far less than in Example 5.

I claim:

1. A process for the purification of a gas stream containing one or more of the following impurities: $H_2S$, COS, $CO_2$ and mercaptans, comprising; (i) contacting the gas stream with an aqueous solvent solution of stabilized monoethanolamine or diethanolamine in such a manner that the impurities are absorbed into the monoethanolamine solution or diethanolamine solution to form a rich solution; (ii) regenerating the monoethanolamine or diethanolamine solvent from the rich solution so as to remove the impurities and (iii) recycling the monoethanolamine or diethanolamine solvent into the aqueous solution and feeding it back into contact with the gas stream in a closed loop and (iv) introducing methyldiethanolamine into the recirculating aqueous solvent solution in an amount from about 4 to about 25 percent by weight based on the total weight of the solution so as to inhibit degradation of the monoethanolamine or diethanolamine in solution.

2. A process as defined in claim 1 wherein said methyldiethanolamine is introduced from about 10 to 20 percent by weight of the monoethanolamine or diethanolamine in solution.

* * * * *